(12) United States Patent
Kawanabe et al.

(10) Patent No.: US 10,279,273 B2
(45) Date of Patent: *May 7, 2019

(54) TRADING CARD AND TRADING CARD SET

(71) Applicant: NINTENDO CO., LTD., Kyoto-shi, Kyoto (JP)

(72) Inventors: Satoshi Kawanabe, Kyoto (JP); Kenko Kawahara, Kyoto (JP); Hideaki Kamata, Kyoto (JP); Norio Asakura, Kyoto (JP)

(73) Assignee: NINTENDO CO., LTD., Kyoto-shi (JP)

( * ) Notice: Subject to any disclaimer, the term of this patent is extended or adjusted under 35 U.S.C. 154(b) by 0 days.

This patent is subject to a terminal disclaimer.

(21) Appl. No.: 15/825,132

(22) Filed: Nov. 29, 2017

(65) Prior Publication Data

US 2018/0078864 A1 Mar. 22, 2018

Related U.S. Application Data

(63) Continuation of application No. 14/971,119, filed on Dec. 16, 2015, now Pat. No. 9,855,506.

(30) Foreign Application Priority Data

Apr. 1, 2015 (JP) ................................ 2015-074954

(51) Int. Cl.
*A63F 1/00* (2006.01)
*A63F 13/98* (2014.01)
(Continued)

(52) U.S. Cl.
CPC ................ *A63F 13/98* (2014.09); *A63F 9/24* (2013.01); *A63F 13/00* (2013.01); *A63F 13/20* (2014.09);
(Continued)

(58) Field of Classification Search
CPC ............. G07F 17/3223; G07F 17/3225; G07F 17/3227; G07F 17/3279; G07F 17/3281;
(Continued)

(56) References Cited

U.S. PATENT DOCUMENTS 9,855,506 B2 * 1/2018 Kawanabe .............. A63F 13/98
2002/0028710 A1 3/2002 Ishihara et al.
(Continued)

FOREIGN PATENT DOCUMENTS

EP 1 162 570 12/2001
JP 11-184993 7/1999
(Continued)

OTHER PUBLICATIONS

European Search Report dated Aug. 9, 2016, issued in corresponding EP Application No. 15199545.3 (6 pages).
The American Heritage Dictionary, 1982, Houghton Mifflin Company, Second College Edition, p. 710.

*Primary Examiner* — Benjamin Layno
(74) *Attorney, Agent, or Firm* — Nixon & Vanderhye P.C.

(57) ABSTRACT

A trading card includes a main portion having any character of a plurality of characters represented on at least one surface and an electronic component for contactless communication, which is contained in the main portion. The electronic component includes a storage portion which stores data related to the character represented on the main portion and a circuit which writes data received from an external apparatus through contactless communication into the storage portion.

21 Claims, 12 Drawing Sheets

(51) Int. Cl.
  *G06K 19/07* (2006.01)
  *A63F 13/20* (2014.01)
  *A63F 9/24* (2006.01)
  *A63F 13/00* (2014.01)
  *G07F 17/32* (2006.01)
  *A63F 13/95* (2014.01)

(52) U.S. Cl.
  CPC ............ *G06K 19/0723* (2013.01); *A63F 1/00* (2013.01); *A63F 13/95* (2014.09); *A63F 2001/008* (2013.01); *A63F 2009/2401* (2013.01); *A63F 2009/2489* (2013.01); *A63F 2300/807* (2013.01); *G07F 17/3223* (2013.01); *G07F 17/3225* (2013.01); *G07F 17/3227* (2013.01); *G07F 17/3279* (2013.01); *G07F 17/3281* (2013.01)

(58) Field of Classification Search
  CPC .................. A63F 1/00; A63F 2001/008; A63F 2009/2489; A63F 2300/807
  USPC ....... 273/292, 293, 295, 308, 237, 255, 262; 463/9, 23
  See application file for complete search history.

(56) References Cited

U.S. PATENT DOCUMENTS

| | | |
|---|---|---|
| 2004/0152521 A1 | 8/2004 | Shinoda |
| 2005/0026683 A1 | 2/2005 | Fujimoto |
| 2012/0125993 A1 | 5/2012 | Thiele |
| 2013/0324262 A1 | 12/2013 | Shimohata et al. |
| 2016/0287998 A1 | 10/2016 | Kawanabe et al. |

FOREIGN PATENT DOCUMENTS

| | | |
|---|---|---|
| JP | 2000-20664 | 1/2000 |
| JP | 2001-334012 | 12/2001 |
| JP | 2002-336399 | 11/2002 |
| JP | 2005-352886 | 12/2005 |
| JP | 2006-288966 | 10/2006 |
| JP | 2007-219806 | 8/2007 |
| JP | 2007-252677 | 10/2007 |
| JP | 2010-049477 | 3/2010 |
| JP | 2011-229898 | 11/2011 |
| JP | 2015-008986 | 1/2015 |
| JP | 2015-039606 | 3/2015 |
| JP | 2015-041280 | 3/2015 |
| JP | 2016-194848 | 11/2016 |

\* cited by examiner

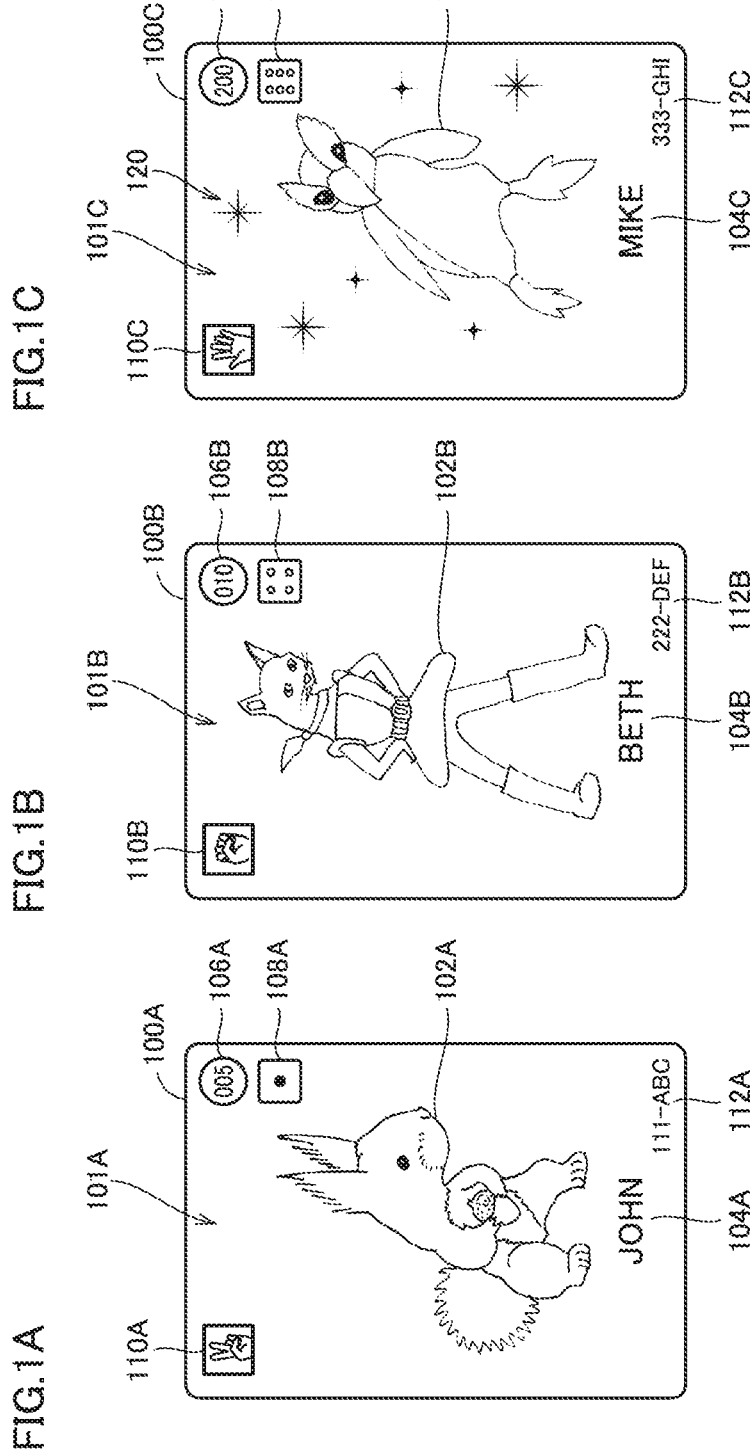

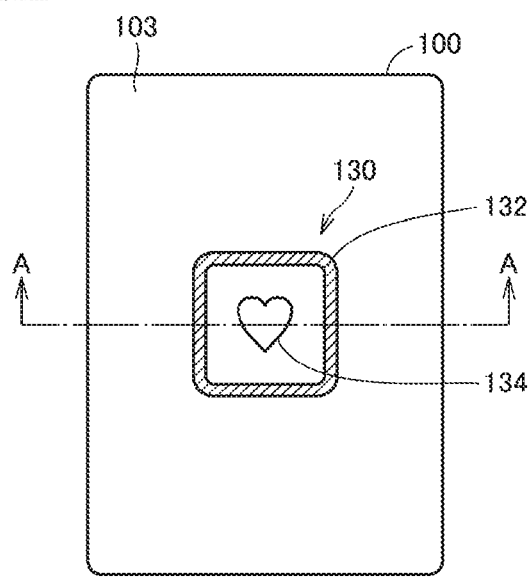

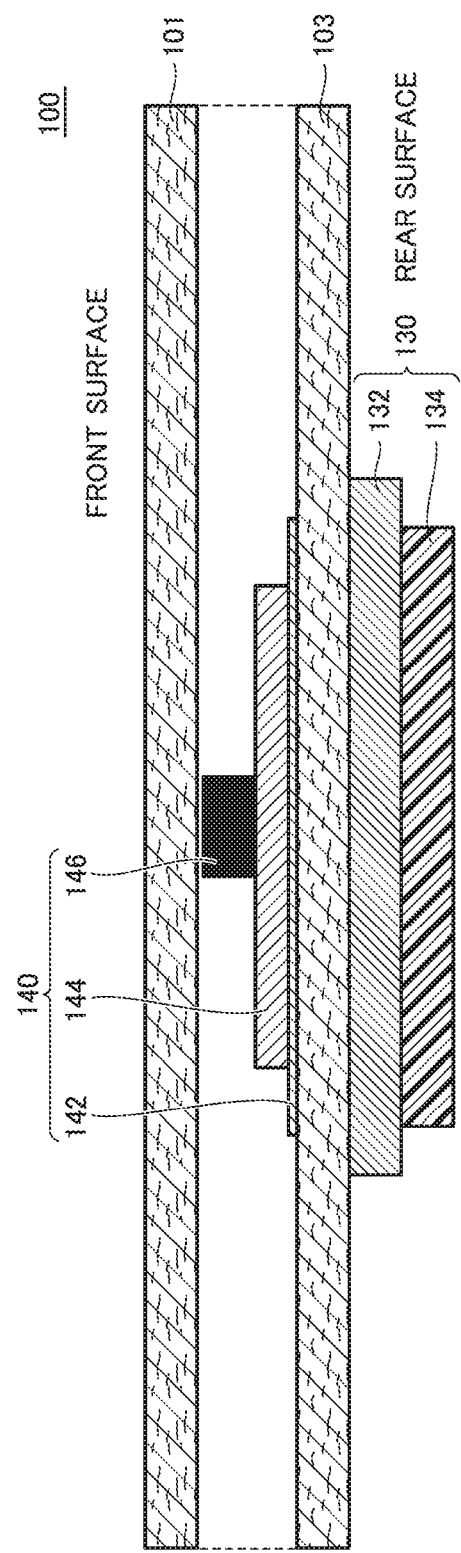

TRADING CARD AND TRADING CARD SET

This nonprovisional application is a Continuation of application Ser. No. 14/971,119, filed on Dec. 16, 2015, now U.S. Pat. No. 9,855,506, and is based on Japanese Patent Application No. 2015-074954 filed with the Japan Patent Office on Apr. 1, 2015, the entire contents of each of which are hereby incorporated by reference.

FIELD

The present technology relates to a trading card having a character represented and a trading card set including the trading card.

BACKGROUND AND SUMMARY

A card having a contactless communication function has conventionally been made use of in an electronic commerce. A contactless IC card has been known to be used for electronic payment or in using public transportation such as trains or buses.

There are trading cards (or collectable cards) which are cards different in sense from cards (single variety) used generally in electronic commerce. The trading cards refer to cards on which variously different pictures are depicted and a purpose thereof is collection and exchange. Namely, the trading cards are cards manufactured and sold aiming at exchange or collection of pictures represented on each surface thereof.

Conventional trading cards have mainly been ornamental, and importance has been given on a picture itself depicted on the surface. In contrast, the present technology pays attention to add to trading cards, values (variety) from a new point of view.

An exemplary embodiment provides a trading card that includes a main portion having layers of paper in a sheet form and an electronic component for contactless communication, which is contained in the main portion. The electronic component includes an antenna which transmits and receives a radio signal involved with contactless communication, a storage portion which stores data related to a character represented on the main portion and includes a first storage area in which writing of additional data is restricted and a second storage area in which writing of additional data is not restricted, and a circuit which writes data received from an external apparatus through contactless communication into the second storage area. Any character of a plurality of characters, information associated with the character, and information for playing are represented on one surface of the main portion. A mark indicating a position of the antenna is represented at a position of arrangement of the antenna on the other surface of the main portion. The data related to the character includes identification information for specifying the character and identification information representing an application in which the character is available or a series of applications in which the character is available.

An exemplary embodiment provides a trading card that includes a main portion having any character of a plurality of characters represented on at least one surface and an electronic component for contactless communication, which is contained in the main portion. The electronic component includes a storage portion which stores data related to a character represented on the main portion and a circuit which writes data received from an external apparatus through contactless communication into the storage portion.

Identification information for specifying the character may be represented on at least one surface.

Information for sensing erroneous recognition may be represented on the at least one surface.

Information for playing may be represented on the at least one surface.

The data related to the character represented on the main portion may include identification information for specifying the character.

The data related to the character represented on the main portion may include identification information representing an application in which the character is available or a series of applications in which the character is available.

The electronic component may include identification information specific to the electronic component.

The storage portion may include a first storage area in which writing of additional data is restricted and a second storage area in which writing of additional data is not restricted.

The first storage area may be a read only area in which writing of data is restricted but from which data can be read, and the second storage area may be a writable area into which data can be written and from which data can be read.

A character ID may be stored in the first storage area.

The electronic component may further include an antenna for transmitting and receiving a radio signal involved with contactless communication, and a mark indicating a position of the antenna may be represented at a position where the antenna is arranged, on a surface different from a surface of the main portion where the character is represented.

The mark may include at least a part of an aluminum layer formed on the surface different from the surface of the main portion where the character is represented and a logo mark formed on the aluminum layer.

The antenna may be arranged at a position other than a central portion of the main portion.

The entire antenna may be located above or below a centerline in a longitudinal direction of the trading card.

At least a part of the main portion may be formed of layers of paper.

The surface on which the character is represented may be subjected to glossing treatment.

As the glossing treatment, a resin material in part or in its entirety is formed on the surface on which the character is represented.

An exemplary embodiment provides a trading card set that includes a plurality of trading cards described in any paragraph described above. Each of the plurality of trading cards may have a character different at least in part represented.

An exemplary embodiment provides a trading card set that may include at least one of the trading cards described in any paragraph described above, a bag portion which accommodates the at least one trading card, and a shielding structure which reduces electromagnetic waves involved with the contactless communication and prevents contactless communication by the electronic component contained in the trading card accommodated in the bag portion.

The shielding structure may include at least two plate-shaped members provided with a conductive member on a surface of the plate-shaped member that are arranged as aligned in a direction perpendicular to the trading card.

The shielding structure may be a card accommodated in the bag portion together with the trading card and having a metal layer.

The shielding structure may be a metal layer provided on an inner surface of the bag portion.

The foregoing and other objects, features, aspects and advantages of the exemplary embodiments will become more apparent from the following detailed description of the exemplary embodiments when taken in conjunction with the accompanying drawings.

BRIEF DESCRIPTION OF THE DRAWINGS

FIGS. 1A to 1C show exemplary illustrative non-limiting drawings illustrating examples of trading cards according to the present embodiment.

FIG. 2 shows an exemplary illustrative non-limiting drawing illustrating a configuration example of a rear surface of the trading card according to the present embodiment.

FIG. 3 shows an exemplary illustrative non-limiting drawing illustrating a cross-sectional view of the trading card along the line A-A shown in FIG. 2.

DESCRIPTION OF THE PREFERRED EMBODIMENTS

Figure 4A:
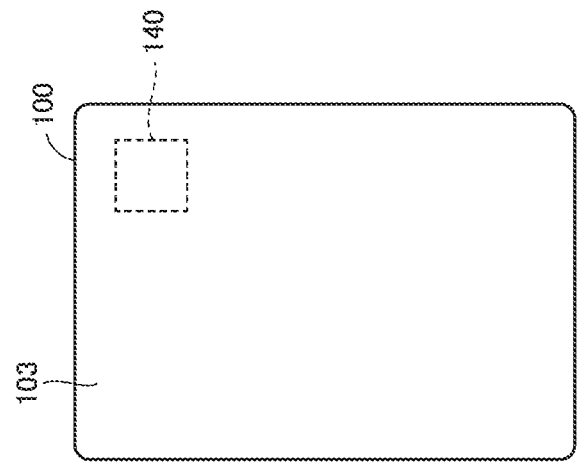
FIGS. 4A to 4C show exemplary illustrative non-limiting drawings illustrating arrangement examples of an RFID inlay in the trading card according to the present embodiment.

The present embodiment will be described in detail with reference to the drawings. The same or corresponding elements in the drawings have the same reference characters allotted and description thereof will not be repeated.

[A. Front Surface of Trading Card]

A trading card according to the present embodiment will initially be described with reference to FIGS. 1A to 1C. FIGS. 1A to 1C schematically show a front surface of three trading cards 100A, 100B, and 100C (hereinafter also collectively referred to as a "trading card 100"). A surface on which a main picture is depicted is defined as a "front surface" and a surface opposite to the "front surface" is referred to as a "rear surface" for the sake of convenience of description herein.

Trading card 100 includes a main portion in a plate shape, which has any character of a plurality of characters represented on at least one surface. More specifically, in trading card 100A, a character 102A is depicted on a first surface member 101A corresponding to the front surface. In trading card 100B, a character 102B is depicted on a first surface member 101B corresponding to the front surface. In trading card 100C, a character 102C is depicted on a first surface member 101C corresponding to the front surface. Namely, in trading card 100 according to the present embodiment, characters 102A to 102C (hereinafter also collectively referred to as a "character 102") are represented as pictures creating values thereof. Character names 104A, 104B, and 104C of characters 102A, 102B, and 102C are also depicted in correspondence with characters 102A, 102B, and 102C, respectively.

Actually, not only three characters exemplified in FIGS. 1A to 1C but also more characters are prepared. The characters are printed in accordance with a probability of appearance (a ratio of generation) set in advance for each of the plurality of characters and trading cards 100 are manufactured. Here, the probability of appearance set in advance for each character is not the same among characters but set in consideration of individuality (a nature, a characteristic, or characterization in a story) set for each character. For example, a specific character of the plurality of characters can significantly be lower in probability of appearance in trading cards 100 than other characters. Such trading card 100 having a character low in probability of appearance depicted, that is, of which production number is small, is called a "premium card," a "rare card," or a "treasure card," and may be traded at a price higher than other trading cards 100.

For example, it is assumed that character 102C depicted on trading card 100C among trading cards 100A to 100C shown in FIGS. 1A to 1C is low in probability of appearance. Namely, trading card 100C is a premium card and such a premium card has been subjected to treatment for making a surface thereof glitter (glossing treatment 120). By providing such glossing treatment 120 to the surface, a user who obtains trading card 100 can be given "premium" feeling.

Such glossing treatment 120 should only be performed with various methods, and in the present embodiment, a lame process is adopted in which varnish is applied onto first surface member 101 and the varnish is decreased in thickness in part so as to partially differ an index of refraction so that a glittering appearance is realized. Namely, in first surface member 101 having specific character 102 among a plurality of characters 102 represented, a resin material formed on the surface where character 102 is represented is subjected to treatment in part or in its entirety so as to differ a reflectance. Glossing treatment 120 is thus realized. As another method of such glossing treatment, a method of realizing gloss (glittering appearance) by applying a reflective material such as a small metallic piece onto first surface member 101 so as to diffuse light (so long as contactless communication is interfered) or a method of providing what is called hologram printing on first surface member 101 is also available. With such glossing treatment, what is called premium feeling (rareness) can be provided to a user or ornamental appearance can be enhanced, and exchange and collection of cards among users can be promoted.

Furthermore, on the front surface of trading card 100, in addition to character 102, character numbers 106A to 106C, die pictures 108A to 108C, and rock, paper, and scissors pictures 110A to 110C are depicted. In addition, in a lower portion of the front surface of trading card 100, character specifying information 112A to 112C is also depicted.

Character numbers 106A to 106C and character specifying information 112A to 112C are information for specifying corresponding characters 102A to 102C, respectively. In other words, corresponding character 102 can uniquely be specified by designating character numbers 106A to 106C or a number in character specifying information 112A to 112C. Namely, on the front surface of trading card 100, together with character 102, information associated with character 102 (character numbers 106A to 106C and character specifying information 112A to 112C) is represented. Namely, on the front surface of trading card 100, together with character 102, identification information for specifying character 102 is represented. Alternatively, on the front surface of trading card 100, information for sensing erroneous recognition is represented together with character 102. More detailed contents and applications of character specifying information 112A to 112C will be described later.

Die pictures 108A to 108C can be used for such an application as play of some kind of game by a plurality of players with the use of a plurality of trading cards 100. Similarly, rock, paper, and scissors pictures 110A to 110C can be used for such an application as playing rock, paper, and scissors among a plurality of persons with the use of a plurality of trading cards 100. Namely, on the front surface of trading card 100, together with character 102, information for playing (die pictures 108A to 108C and rock, paper, and scissors pictures 110A to 110C) is represented.

For such information for playing, a physical strength gauge value or an offensive/defensive strength value of each character 102 may be used.

[B. Contactless-Contact Communication Function]

Trading card 100 according to the present embodiment incorporates a contactless communication function. This contactless communication function provides trading card 100 with values from a new point of view. In the present embodiment, by way of example of contactless communication, communication under what is called near field communication (NFC) specifications is established between trading card 100 and an NFC reader-writer. Contactless communication herein refers to a communication scheme in which radio waves (for example, electromagnetic induction) from one apparatus located in the NFC reader-writer generate electromotive force in the other apparatus located on a side of trading card 100 by way of example. The apparatus located on the side of trading card 100 can operate with generated electromotive force (basically, it does not have a power supply, however, a case that it has a power supply can also be assumed).

In contactless communication, communication can be established when trading card 100 and the NFC reader-writer are proximate to each other (typically, a distance therebetween is not greater than several centimeters or not greater than several dozen centimeters). In contactless communication, sending of radio waves continues while communication between them is maintained (while some trading card 100 is proximate to the NFC reader-writer). Though a scheme of communication through radio waves is described by way of example, limitation thereto is not particularly intended. Optical communication or communication via other media may be applicable and a scheme is not limited.

A configuration for this contactless communication is arranged in trading card 100. Namely, an electronic component for contactless communication is contained in the main portion of trading card 100.

With incorporation of contactless communication, by holding trading card 100 over the NFC reader-writer, information stored in trading card 100 can be read and information stored in trading card 100 can be updated (or new information can be written).

More specifically, trading card 100 contains a storage portion which stores data related to character 102 represented on the main portion and a circuit which writes data received from an external apparatus through contactless communication into the storage portion. By way of one mount example, an electronic component including a storage portion and a writing circuit is arranged in trading card 100 in a form of a radio frequency identification (RFID) inlay. A configuration of the electronic component will be described below in association with a rear surface of trading card 100.

[C. Rear Surface of Trading Card]

Referring to FIG. 2, a presentation picture 130 indicating a position of an antenna used for contactless communication is depicted on a second surface member 103 corresponding to the rear surface of trading card 100. Namely, a mark (presentation picture 130) indicating a position of the antenna is represented at a position where the antenna is arranged, on a surface (rear surface) different from the surface (front surface) where character 102 is represented. With the presence of the mark, a user can understand at a glance which part of trading card 100 should be brought closer to the NFC reader-writer for contactless communication, and convenience in contactless communication with the use of the card is improved. By providing the mark on the surface different from the surface where character 102 is represented, a position of the antenna can be confirmed without impairing quality of design of the depicted character (in addition, variety is also improved).

Though FIG. 2 shows an example in which a design on the rear surface is common without depending on character 102 depicted on the front surface of trading card 100, limitation thereto is not intended. Each different picture or design may be provided also on the rear surface, and for example, a picture or a design associated with character 102 depicted on the front surface may be provided.

More specifically, presentation picture 130 is made up of an aluminum layer 132 and a printed layer 134 formed on aluminum layer 132.

FIG. 3 shows a cross-section of trading card 100 along the line A-A shown in FIG. 2. A thickness of each layer shown in FIG. 3 does not necessarily correspond to an actual value, but is depicted to be larger or smaller than an actual thickness for the sake of convenience of description. By way of example, the total thickness of trading card 100 is designed approximately to 0.3 mm to 1.0 mm.

Referring to FIG. 3, trading card 100 includes, as a main portion, first surface member 101 corresponding to the front surface and second surface member 103 corresponding to the rear surface. The main portion of trading card 100 substantially corresponds to first surface member 101 and second surface member 103. Printing paper can be used for first surface member 101 and second surface member 103 in order to provide various designs to the surfaces thereof. Namely, at least a part of the main portion of trading card 100 is made of layers of paper.

An RFID inlay 140 is arranged between first surface member 101 and second surface member 103. RFID inlay 140 is an electronic component in which a circuit necessary for contactless communication and an antenna have been integrated. More specifically, RFID inlay 140 mainly includes a buffering film 142, an antenna 144, and an IC chip 146.

A resin in accordance with a withstand load is employed for buffering film 142, and for example, a polyethylene terephthalate (PET) resin may be employed. Antenna 144 transmits and receives a radio signal involved with contactless communication. More specifically, antenna 144 is made of a lead wound a plurality of times along a surface of buffering film 142 and electrically connected to IC chip 146. As will be described later, IC chip 146 includes a transmission and reception circuit receiving radio waves (including a command) through antenna 144 and transmitting radio waves (including a command response) from antenna 144 and a control circuit.

Presentation picture 130 is provided on the rear surface in correspondence with a position where antenna 144 is arranged. Though FIG. 2 shows presentation picture 130 substantially in a square shape, any shape can be adopted. For example, presentation picture 130 may be formed in such a shape as a circle, a pentagon, a hexagon, or an octagon. As described above, presentation picture 130 is made up of aluminum layer 132 and printed layer 134 formed on aluminum layer 132. Aluminum layer 132 is typically formed through vapor deposition of aluminum, and printed layer 134 is formed by printing (application of ink) after vapor deposition of aluminum. A logo mark which is a mark symbolizing trading card 100 or symbolizing a manufacturer or a distributor of trading card 100 can also be employed as a mark depicted on printed layer 134.

Thus, a mark indicating a position of antenna 144 includes a part of aluminum layer 132 formed on the surface (rear surface) different from the surface (front surface) having character 102 represented and a logo mark formed on aluminum layer 132 (a part of the mark depicted on printed layer 134).

Though FIG. 3 shows a configuration example in which IC chip 146 is arranged on the side of the front surface and antenna 144 is arranged on the side of the rear surface, positional relation between IC chip 146 and antenna 144 may be reverse (that is, when viewed from the side of the rear surface, IC chip 146, antenna 144, and buffering film 142 may be arranged in this order, and in that case, buffering film 142 is arranged on an inner surface of the front surface). As will be described later, however, in such a form of use that communication with the NFC reader-writer is established while character 102 depicted on the front surface of trading card 100 is shown, antenna 144 may be closer to the rear surface in order to ensure intensity of radio waves incident on antenna 144.

Though FIG. 3 shows a configuration example in which IC chip 146 is arranged in correspondence with a substantially central position of antenna 144, positional relation between antenna 144 and IC chip 146 in a surface can be designed as appropriate. Namely, IC chip 146 may be arranged at a position decentered from antenna 144.

Figure 4B:
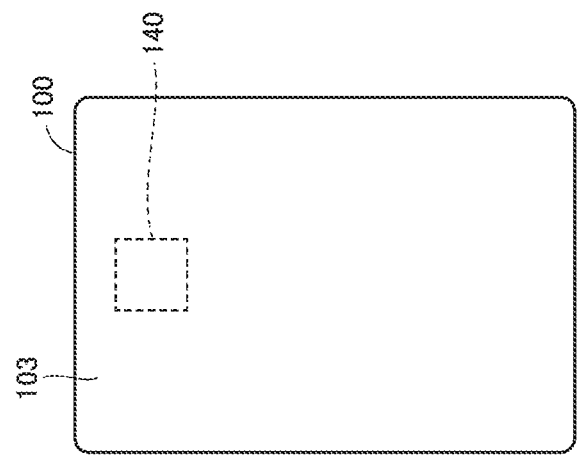
Figure 4C:
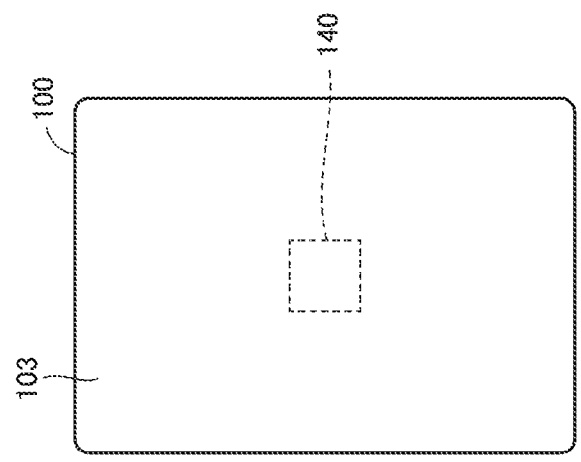

As shown in FIGS. 4A to 4C, RFID inlay 140 itself can also be arranged at any position.

FIG. 4A shows an example in which RFID inlay 140 including antenna 144 and IC chip 146 is arranged in a substantially central portion of trading card 100. According to the arrangement example shown in FIG. 4A, since RFID inlay 140 including antenna 144 is arranged in the substantially central portion of trading card 100, possibility of perplexity of user at the time when he/she holds trading card 100 over the NFC reader-writer can be lowered.

FIG. 4B shows an example in which RFID inlay 140 including antenna 144 and IC chip 146 is arranged in the center in a lateral direction of trading card 100 and on an end side (an outer side) in a vertical direction. As shown in FIG. 4B, by arranging RFID inlay 140 as being displaced from the central portion of trading card 100, displacement (or stress) caused in RFID inlay 140 at the time when trading card 100 is bent (or flexed) can further be lessened. Therefore, possibility of breakage of RFID inlay 140 by external force involved with deformation of trading card 100 can be lowered.

FIG. 4C shows an example in which RFID inlay 140 including antenna 144 and IC chip 146 is arranged on an end side (an outer side) in both of the lateral direction and the vertical direction of trading card 100. In the arrangement example shown in FIG. 4C, magnitude of external force generated in RFID inlay 140 involved with deformation of trading card 100 can be lower than in the arrangement example shown in FIG. 4B. Therefore, possibility of breakage of RFID inlay 140 by external force can further be lowered.

As shown in FIGS. 4B and 4C, from a point of view of lowering in possibility of breakage of RFID inlay 140 (antenna 144 and IC chip 146), the RFID inlay may also be arranged at a position displaced from the central portion in the main surface of trading card 100. For example, the entire antenna 144 may be located above or below a centerline in a longitudinal direction of trading card 100.

[D. One Example of Form of Use]

One example of a form of use of trading card 100 according to the present embodiment will now be described with reference to FIG. 5.

Figure 5:
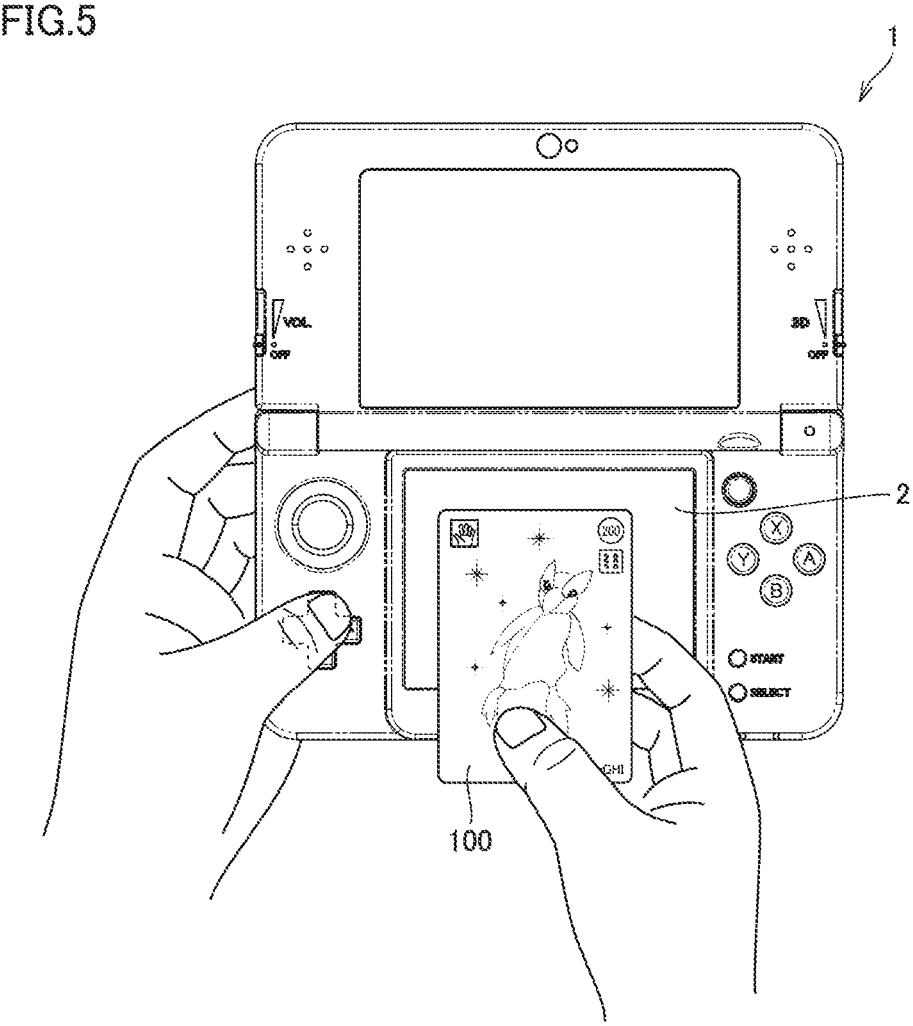
FIG. 5 shows an exemplary illustrative non-limiting drawing illustrating one example of a form of use of the trading card according to the present embodiment.

FIG. 5 shows an example in which a portable game device 1 is used as the NFC reader-writer. Portable game device 1 adopts a foldable configuration having two screens, and has an antenna for transmitting and receiving radio waves used for contactless communication built in a lower display 2. Typically, the user holds portable game device 1 with one hand and holds trading card 100 over lower display 2 with the other hand, so that information is exchanged between trading card 100 and portable game device 1. With data read from trading card 100, a game can proceed in portable game device 1, or as the game proceeds in portable game device 1, a result thereof can be written into trading card 100.

The data read from trading card 100 may be made use of in any manner, and data written into trading card 100 may be obtained or generated in any manner. Namely, data exchanged with trading card 100 can be associated with any information processing performed in portable game device 1.

Though FIG. 5 exemplifies a configuration in which portable game device 1 is employed as the NFC reader-writer for the sake of convenience of description, any device capable of contactless communication (NFC) may exchange data with trading card 100.

[E. Circuit Configuration]

A circuit configuration of RFID inlay 140 contained in the main portion (first surface member 101 and second surface member 103) of trading card 100 will now be described.

Figure 6:
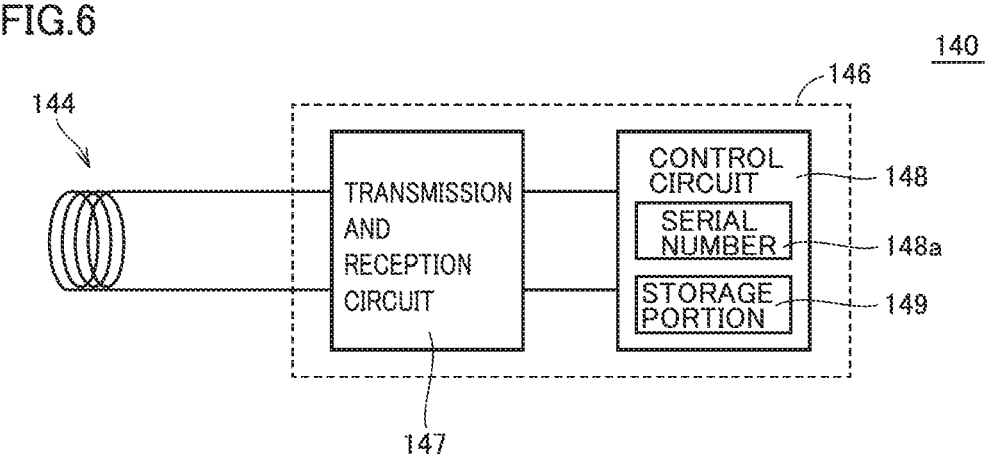
FIG. 6 shows an exemplary illustrative non-limiting drawing illustrating a circuit configuration of the RFID inlay contained in the trading card according to the present embodiment.

Referring to FIG. 6, RFID inlay 140 representing the electronic component includes antenna 144 for transmitting and receiving a radio signal involved with contactless communication and IC chip 146 electrically connected to antenna 144. IC chip 146 includes a transmission and reception circuit 147 and a control circuit 148 electrically connected to transmission and reception circuit 147. Control circuit 148 includes a storage portion 149. Storage portion 149 stores data related to character 102 represented on the main portion of trading card 100. Control circuit 148 includes a circuit which writes data received from an external apparatus through contactless communication into storage portion 149.

Figure 7:
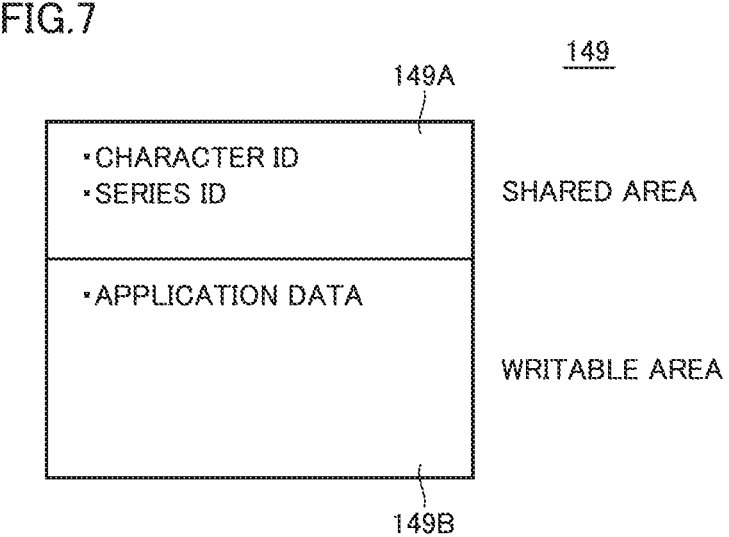
FIG. 7 shows an exemplary illustrative non-limiting drawing illustrating one example of a data structure of a storage portion built in a control circuit shown in FIG. 6.

Referring to FIG. 7, storage portion 149 includes a shared area 149A and a writable area 149B. Shared area 149A is a circuit in which writing of additional data is restricted and writable area 149B is a storage area in which writing of additional data is not restricted. For example, shared area 149A is an area (a read only area) from which data is only read, and restriction for not allowing writing of data (overwrite of data) is set for the shared area. No restriction is set for writable area 149B, and data can be written therein. Even in the writable area, however, before data is written, simple checking such as checking as to whether or not a format of data to be written is appropriate or checking as to whether or not an order of writing of a group of data to be written is correct may be made.

Shared area 149A includes a character ID and a series ID which represent data related to character 102. Namely, a character ID is stored in shared area 149A.

A character ID is identification information for specifying character 102 depicted on each trading card 100. A character ID is set so as to be able to uniquely specify character 102 in a specific application (for example, a game application). In this case, each application includes correspondence between a character ID and character 102. When some character ID is read from trading card 100 while some application is executed, information on a character (such as a character image) corresponding to the character ID is determined by referring to correspondence held in advance. Even though the same character is depicted on cards, a different character ID may be set for each card depending on a difference in pose or appearance, and a different corresponding character image may also be determined.

Alternatively, setting may be made such that character 102 can uniquely be specified among a plurality of applications. In this case, correspondence between a character ID and character 102 may commonly be held among the plurality of applications. Alternatively, when a network can be made use of, a server which can commonly be made use of by applications may be accessed so that information on a character (for example, a character image) corresponding to a character ID read from trading card 100 is determined.

A series ID represents one example of identification information indicating an application in which character 102 depicted on each trading card 100 is available or a series of applications in which the character is available. More specifically, the series ID is identification information specifying one application or a plurality of applications in which a user can play with character 102 depicted on each trading card 100. When there is only one application in which a certain character is available, the series ID substantially specifies one application. In contrast, when there are a plurality of applications in which a certain character is available, the series ID specifies a series of relevant applications.

The character ID and the series ID are protected or encrypted such that writing or updating is not allowed in response to a normal command from the NFC reader-writer (portable game device 1 in the present embodiment). Namely, writing of or updating with additional data is restricted such that correspondence with character 102 depicted on each trading card 100 is maintained.

In contrast, writable area 149B is an area in which an application using character 102 depicted on trading card 100 can write or update. Data generated through processing by an application is written in writable area 149B as appropriate. When a plurality of applications write data into writable area 149B, there is a possibility of failure due to presence of data as mixed, and hence only a single application designated through a specific operation by a user may be able to access writable area 149B. An application which can access writable area 149B can be changed later.

Control circuit 148 is uniquely allocated to an RFID inlay (or IC chip 146). Referring again to FIG. 6, control circuit 148 has a serial number 148a stored therein and returns a value for stored serial number 148a in response to an instruction from the NFC reader-writer. Namely, RFID inlay 140 representing the electronic component includes identification information specific to RFID inlay 140. Such identification information can be used for various types of authentication processing.

[F. Trading Card Set and Function to Prevent Unauthorized Reading]

A form of sale of trading card 100 according to the present embodiment as described above will now be described. Normally, a trading card is sold in such a state that one trading card or a plurality of trading cards is/are packed in a single package and a picture depicted on a surface thereof is not seen. In general, since value of a trading card is determined by a picture thereof, a purchaser can look forward to which picture is depicted on a trading card in a package which he/she has purchased.

In selling trading card 100 according to the present embodiment, a plurality of trading cards 100 are selected such that there is no overlap in character 102 in the same package. Namely, a trading card set according to the present embodiment (a state at the time point of sale) includes a plurality of trading cards 100 and at least two of the plurality of trading cards 100 have characters 102 different from each other represented.

As described above, trading card 100 according to the present embodiment incorporates a contactless communication function. Even though the trading cards are sold in a package, a character of trading card 100 contained therein can be specified if stored information can be read with some kind of an NFC reader-writer. When information is read while the trading cards are sold in a package, the information can be used for play on an application without purchasing cards. In order to prevent such unauthorized reading, access by radio waves to trading card 100 contained in the package from the outside of the package may be blocked.

Namely, the trading card set according to the present embodiment includes not only at least one trading card 100 and a package (a bag portion) accommodating at least one trading card 100 but also a shielding function preventing electromagnetic waves from the outside of the package (bag portion) from reaching trading card 100 accommodated in the package (bag portion). Namely, the shielding function reduces electromagnetic waves involved with contactless communication and prevents contactless communication by the electronic component contained in trading card 100 accommodated in the package (bag portion). Some mount examples of such a shielding function will be described below.

(f1: First Mount Example)

Figure 8:
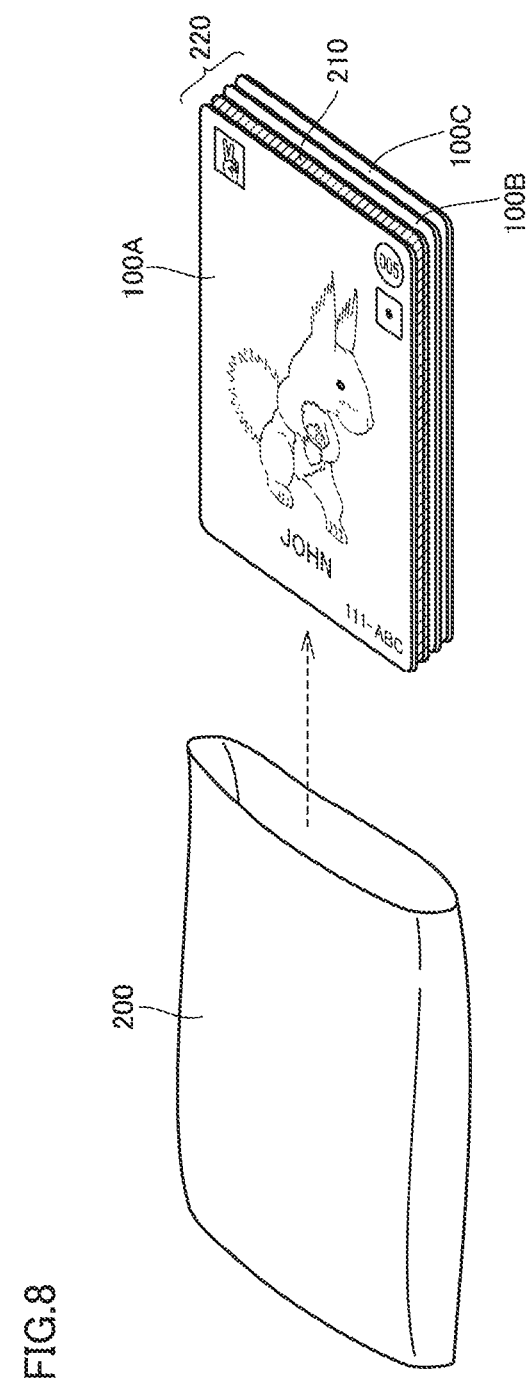
FIG. 8 shows an exemplary illustrative non-limiting drawing illustrating a first mount example of a function to prevent unauthorized reading of the trading card according to the present embodiment.

Referring to FIG. 8, in a first mount example of the shielding function, a conductive card is mixed in between a plurality of trading cards 100. Namely, a trading card set in which a plurality of trading cards 100 (in the example shown in FIG. 8, three trading cards 100A to 100C) are enclosed in a package 200 is shown. Package 200 is sealed like a pillow.

An aluminum card 210 is arranged between trading cards 100A and 100B or between 100B and 100C. Namely, the trading card set may be sold with a set 220 of trading cards 100A to 100C and aluminum card 210 being enclosed in package 200. Namely, a plate-shaped member (aluminum card 210) arranged as aligned in a direction perpendicular to the main surface of at least one trading card 100 and provided with a conductive member (for example, aluminum) on its surface is included as a member exhibiting the shielding function.

For example, aluminum card 210 has an aluminum layer formed on its opposing surfaces with such a technique as vapor deposition of aluminum onto printing paper. An aluminum layer may be formed over the entire at least one surface of aluminum card 210. Any electrode pattern may be formed on a surface. For example, electromagnetic waves can more efficiently be prevented from reaching trading card 100 by employing a spiral electrode pattern so as to generate an eddy current in the electrode pattern. The aluminum layer does not have to cover the entire surface of the card but may cover only a part of the card, for example, only around an antenna portion. From a point of view of manufacturing cost, aluminum may be employed, however, a surface layer should only be formed with any conductive material (for example, any metal). Thus, a card (aluminum card 210) accommodated in the package (bag portion) together with trading card 100 and having a metal layer is included as a member exhibiting the shielding function.

For example, one aluminum card 210 may be arranged every three trading cards 100. When more trading cards 100 are enclosed in package 200, two or more aluminum cards 210 can also be mixed every prescribed number of cards.

A surface of aluminum card 210 may be used as a space for a manual of trading card 100 or as a space for a manual or an advertisement of trading card 100 or a product relating thereto.

In order to exhibit the shielding function in set 220 (trading cards 100A to 100C and aluminum card 210) shown in FIG. 8, cards should be in intimate contact with each other. Therefore, an inner cross-sectional shape of package 200 can be designed such that a gap (a margin) from an outer cross-sectional shape of set 220 is small.

(f2: Second Mount Example)

Figure 9:
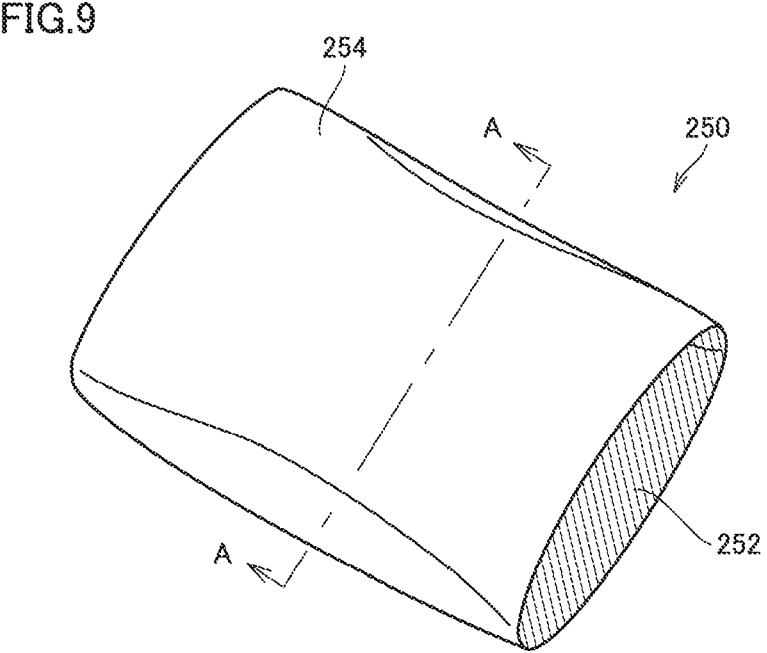
FIG. 9 shows an exemplary illustrative non-limiting drawing illustrating a second mount example of the function to prevent unauthorized reading of the trading card according to the present embodiment.
Figure 10:
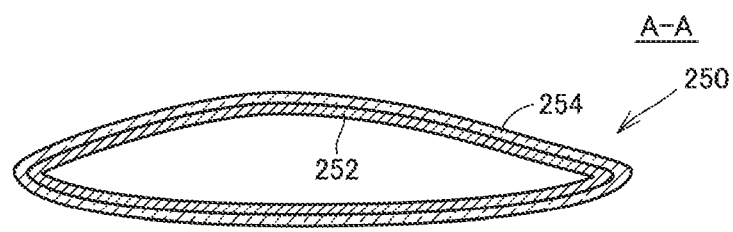
FIG. 10 shows an exemplary illustrative non-limiting drawing illustrating a cross-sectional view of a package shown in FIG. 9.

Referring to FIGS. 9 and 10, a conductive member layer 252 for exhibiting the shielding function is formed on the entire inner surface of a package 250. For example, a layer of a resin or the like is formed on an outer side of conductive member layer 252. In order to exhibit the shielding function, conductive member layer 252 is formed to have a prescribed thickness. Namely, package 250 (bag portion) according to the present embodiment includes a metal layer provided on an inner surface thereof as a shielding structure.

In the second mount example shown in FIGS. 9 and 10, a plurality of trading cards 100 do not have to be intimate contact with each other. Therefore, the inner cross-sectional shape of package 250 may be formed with a slightly more margin with respect to the outer cross-sectional shape of the plurality of trading cards 100.

(f3: Third Mount Example)

Figure 11:
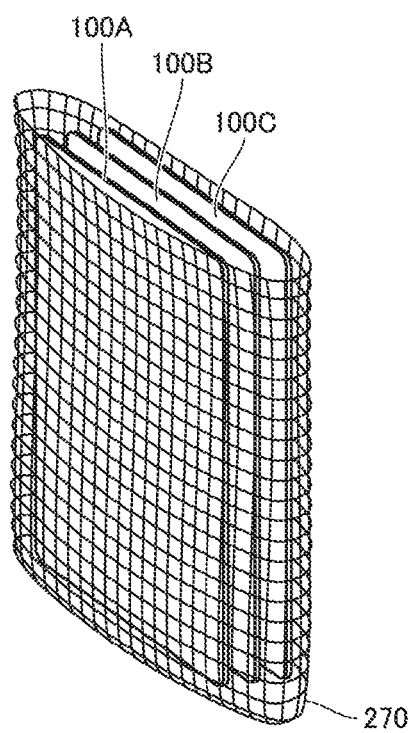
FIG. 11 shows an exemplary illustrative non-limiting drawing illustrating a third mount example of the function to prevent unauthorized reading of the trading card according to the present embodiment.

Referring to FIG. 11, three trading cards 100A to 100C may be enclosed as a set, in a conductive mesh bag portion 270. In this case, three trading cards 100A to 100C enclosed in mesh bag portion 270 are further enclosed in an opaque outer bag.

(f4: Fourth Mount Example)

A metal film like a seal may directly be stuck to the entire trading card 100 or around antenna 144.

[G. Manufacturing Process]

A process for manufacturing trading cards 100 according to the present embodiment will now be described.

Figure 12:
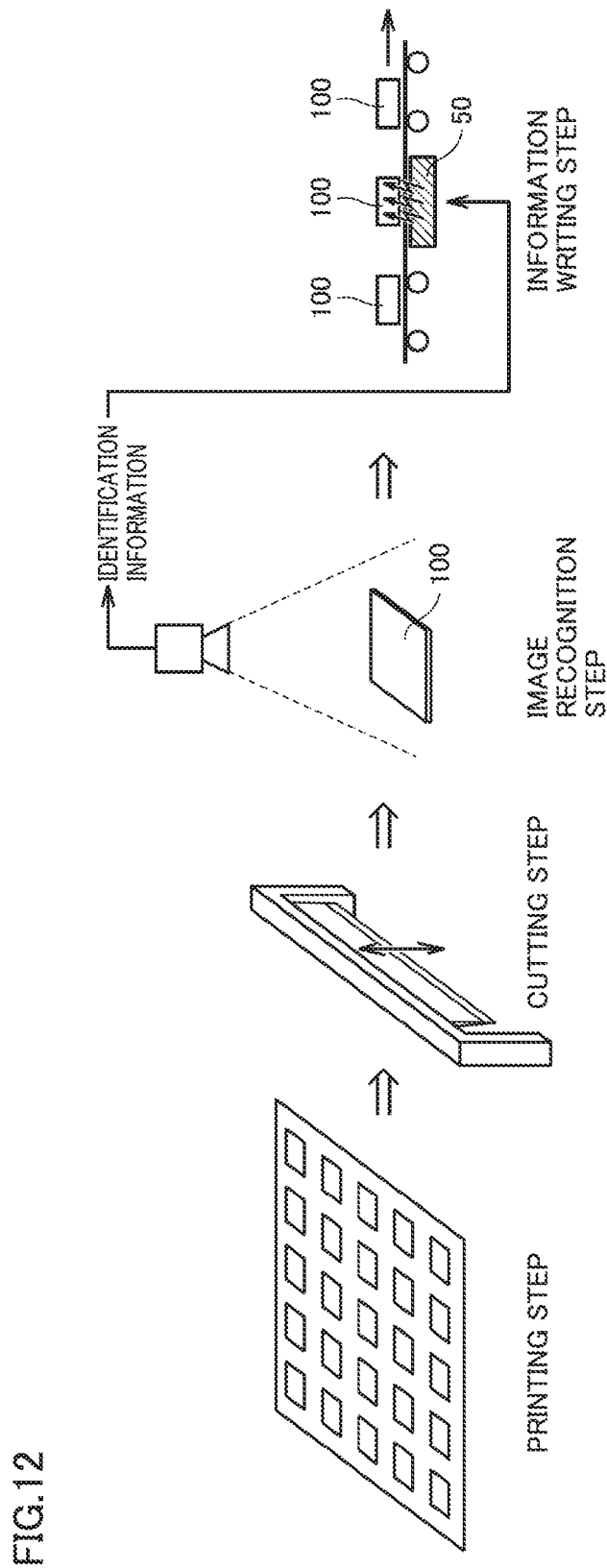
FIG. 12 shows an exemplary illustrative non-limiting drawing illustrating one example of a process for manufacturing trading cards according to the present embodiment.

Referring to FIG. 12, the process for manufacturing trading cards 100 includes a printing step, a cutting step, an image recognition step, and an information writing step.

In the printing step, typically, print patterns randomly selected from a plurality in accordance with a predetermined probability of appearance are printed on printing paper. Each print pattern corresponds to a design on the front surface or the rear surface of trading card 100. Namely, a plurality of trading cards 100 are randomly imposed. Exclusion processing is performed such that the same trading card 100 is not imposed on the same printing paper. A plurality of RFID inlays 140 are regularly arranged in advance in correspondence with imposition positions. A set of sheets of printed paper corresponding to the front surface and the rear surface, respectively, may be prepared, RFID inlay 140 may regularly be arranged therebetween, and then they may be bonded to each other.

In succession, the printed paper is cut in a prescribed size to thereby generate trading cards 100. Since no data has yet been written in RFID inlay 140 contained in each trading card 100 in this state, character specifying information 112 (see FIGS. 1A to 1C) printed on the front surface is optically read so as to write information associated with character 102 depicted on each trading card 100.

Specifically, in the image recognition step, character specifying information 112 (see FIGS. 1A to 1C) present on the front surface of cut trading card 100 is read, and a value thereof (a letter or a numeric value) is recognized. Then, based on the recognized information, corresponding identification information (a character ID and a series ID) is written in shared area 149A (see FIG. 7) of storage portion 149. Through this information writing step, trading cards 100 according to the present embodiment are completed.

Character specifying information 112 (see FIGS. 1A to 1C) used in this image recognition step may include additional information for preventing erroneous recognition in addition to identification information for specifying character 102 depicted on the front surface of each trading card 100. Namely, character specifying information 112 which is a part of information associated with character 102 may include identification information for specifying character 102 and information for sensing erroneous recognition. By including such information for sensing erroneous recognition, information different from the information corresponding to depicted character 102 can be prevented from erroneously being written in trading card 100.

[H. Advantages]

The present embodiment can provide a trading card with values from a new point of view and enhance variety of a trading card.

While certain example systems, methods, devices, and apparatuses have been described herein, it is to be understood that the appended claims are not to be limited to the systems, methods, devices, and apparatuses disclosed, but on the contrary, are intended to cover various modifications and equivalent arrangements included within the spirit and scope of the appended claims.

What is claimed is:

1. A trading card, comprising:
   a main portion having any character of a plurality of characters represented on at least one surface; and
   an electronic component for contactless communication, which is contained in the main portion, the electronic component including
    a storage portion which stores data related to a character represented on the main portion, and
    a circuit which writes data received from an external apparatus through contactless communication into the storage portion, wherein:
the data related to the character represented on the main portion includes:
    (i) identification information for specifying the character, and
    (ii) identification information representing an application in which the character is available or a series of applications in which the character is available;
the data related to the character represented on the main portion including identification information (i) and (ii) is protected or encrypted such that writing or updating is not allowed in response to a certain command from the external apparatus.

2. The trading card according to claim 1, wherein information for sensing erroneous recognition is represented on the at least one surface.

3. The trading card according to claim 1, wherein information for playing is represented on the at least one surface.

4. The trading card according to claim 1, wherein the storage portion includes a first storage area in which writing of additional data is restricted and a second storage area in which writing of additional data is not restricted.

5. The trading card according to claim 4, wherein the first storage area is a read only area in which writing of data is restricted but from which data can be read, and
the second storage area is a writable area into which data can be written and from which data can be read.

6. The trading card according to claim 1, wherein the electronic component further includes an antenna for transmitting and receiving a radio signal involved with contactless communication, and
a mark indicating a position of the antenna is represented at a position where the antenna is arranged, on a surface of the main portion different from a surface of the main portion where the character is represented.

7. The trading card according to claim 6, wherein the mark includes at least a part of an aluminum layer formed on the surface different from the surface of the main portion where the character is represented and a logo mark formed on the aluminum layer.

8. The trading card according to claim 6, wherein the antenna is arranged at a position other than a central portion of the main portion.

9. The trading card according to claim 1, wherein at least a part of the main portion is formed of layers of paper.

10. The trading card according to claim 1, wherein the surface on which the character is represented has been subjected to glossing treatment.

11. The trading card according to claim 10, wherein as the glossing treatment, a resin material in part or in entirety is formed on the surface on which the character is represented.

12. A trading card set, comprising a plurality of the trading cards according to claim 1,
at least two of the plurality of trading cards having characters different from each other represented.

13. The trading card according to claim 1, wherein the identification information for specifying the character is represented on the at least one surface.

14. A trading card set, comprising:
one or more trading cards, each of the trading cards comprising
    a main portion having any character of a plurality of characters represented on at least one surface, and
    an electronic component for contactless communication, which is contained in the main portion,
    the electronic component including
        a storage portion which stores data related to a character represented on the main portion, and
        a circuit which writes data received from an external apparatus through contactless communication into the storage portion, wherein
    the data related to the character represented on the main portion includes:
        (i) identification information for specifying the character, and
        (ii) identification information representing an application in which the character is available or a series of applications in which the character is available;
    the data related to the character represented on the main portion including identification information (i) and (ii) is protected or encrypted such that writing or updating is not allowed in response to a certain command from the external apparatus;
a bag portion which accommodates the at least one trading card; and
a shielding structure which reduces electromagnetic waves involved with the contactless communication and prevents contactless communication by the electronic component contained in the trading card accommodated in the bag portion.

15. The trading card set according to claim 14, comprising, as the shielding structure, a plate-shaped member arranged as aligned in a direction perpendicular to the at least one trading card, wherein the plate-shaped member has a conductive member on a surface of the plate-shaped member.

16. The trading card set according to claim 14, comprising, as the shielding structure, a card accommodated in the bag portion together with the trading card and having a metal layer.

17. The trading card set according to claim 14, comprising, as the shielding structure, a metal layer provided on an inner surface of the bag portion.

18. The trading card set according to claim 14, wherein the identification information for specifying the character is represented on the at least one surface.

19. A trading card, comprising:
a main portion having any character of a plurality of characters represented on at least one surface; and
an electronic component for contactless communication, which is contained in the main portion,
the electronic component including
    a storage portion which stores data related to a character represented on the main portion, and
    a circuit which writes data received from an external apparatus through contactless communication into the storage portion, wherein:
identification information for specifying the character is represented on the at least one surface; and the storage portion includes a first storage area in which writing of additional data is restricted and a second storage area in which writing of additional data is not restricted.

20. A trading card, comprising:

a main portion having any character of a plurality of characters represented on at least one surface; and an electronic component for contactless communication, which is contained in the main portion, the electronic component including a storage portion which stores data related to a character represented on the main portion, and a circuit which writes data received from an external apparatus through contactless communication into the storage portion, wherein:

identification information for specifying the character is represented on the at least one surface;

the electronic component further includes an antenna for transmitting and receiving a radio signal involved with contactless communication, and a mark indicating a position of the antenna is represented at a position where the antenna is arranged, on a surface of the main portion different from a surface of the main portion where the character is represented.

21. A trading card, comprising:

a main portion having any character of a plurality of characters represented on at least one surface; and an electronic component for contactless communication, which is contained in the main portion, the electronic component including a storage portion which stores data related to a character represented on the main portion, and a circuit which writes data received from an external apparatus through contactless communication into the storage portion, wherein:

the data related to the character represented on the main portion includes:

(i) identification information for specifying the character, and (ii) identification information representing an application in which the character is available or a series of applications in which the character is available;

the storage portion includes a first storage area in which writing of data is restricted but which data can be read, and the data related to the character represented on the main portion including identification information (i) and (ii) is stored in the first storage area.

* * * * *